Patented Dec. 14, 1948

2,456,027

UNITED STATES PATENT OFFICE 2,456,027

METHOD OF MAKING FLUOROCARBONS

Joseph H. Simons, State College, Pa., assignor to Minnesota Mining & Manufacturing Company, St. Paul, Minn., a corporation of Delaware No Drawing. Application April 1, 1944, Serial No. 529,182

4 Claims. (Cl. 260—648)

This invention relates to new chemical compounds of carbon and fluorine and to a novel and simple process for the preparation of these new compounds.

This application is a continuation-in-part of my copending application Serial No. 237,157 filed October 26, 1938, now abandoned.

An object of this invention is to provide a new and useful catalytic process for the preparation of fluorocarbons by the reaction of carbon and fluorine. A feature of this process is that it permits of obtaining substantial yields of fluorocarbons containing three or more carbon atoms in the molecule, at reaction temperatures in the range of 200 to 600° C., and the reaction is smooth and non-explosive. This novel process makes it possible not only to prepare fluorocarbons of the aliphatic type ($C_nF_{2n+2}$), but also cyclic types.

This process makes possible the production of normally liquid aliphatic fluorocarbons (having boiling points above 20° C.). These contain five or more carbon atoms in the molecule, are chemically inert, and are thermally stable at temperatures up to at least 750° C.

It has been known that lower molecular weight organic compounds containing fluorine could be prepared by a number of different methods. Primarily such compounds have consisted of partially or completely substituted fluorine derivatives of methane, such as mono-, di-, tri-, and tetra-fluoro methane, $CH_3F$, $CH_2F_2$, $CHF_3$, and $CF_4$. These compounds have in general been prepared by the reaction of fluorinating agents such as antimony fluoride or silver fluoride with halogenated aliphatic hydrocarbons, or in particular by special methods for each compound.

It has also been known that carbon and fluorine will react at relatively low temperatures ranging from approximately 280° C. to 420° C., depending upon the form of carbon used, to produce carbon monofluoride $(CF)_n$ in the form of a whitish solid composition which is unstable and explodes violently upon further heating. On the other hand, the compounds of carbon and fluorine of this invention are characterized by thermal stability at temperatures at least as high as 1,000° C.

Prior to this invention attempts to produce fluorocarbons by directly reacting carbon with fluorine have resulted in explosions unless carried out at temperatures not substantially less than 700° C. and at these high temperatures it has been found that the only compounds of carbon and fluorine which could be produced in identifiable quantities were $CF_4$ and $C_2F_6$. In order to produce the higher compounds having at least three carbons to the molecule, it is necessary to conduct the reaction at temperatures in the range of 200° C. to 600° C. and, as above noted, prior attempts to accomplish such reactions at these temperatures have resulted only in violent explosions.

I have discovered that by conducting the reaction of carbon and fluorine in the presence of fluorides of mercury, antimony, aluminum and iron, a calm reaction is obtained at temperatures in the range of 200° C. to 600° C. and that the product of such reaction is a mixture of fluorocarbons including substantial proportions of fluorocarbons having three or more carbon atoms to the molecule. In general, the proportion of the compounds having three or more carbon atoms per molecule is increased as the temperature at which a calm reaction is obtainable is decreased. The fluorides above mentioned act as catalysts for the reaction and may be introduced as such or produced in situ from the respective elements or other compounds thereof since by reason of the extreme chemical activity of fluorine, either the elements or their compounds are readily converted into the corresponding fluorides at the temperatures used in these reactions.

Furthermore, I have succeeded in isolating and characterizing certain of the higher fluorocarbons resulting from the above mentioned process, as well as certain mixtures of higher fluorocarbons as hereinafter set forth. To the best of my knowledge, neither these fluorocarbons nor these mixtures have been produced prior to my discovery and thus they constitute new compositions of matter produced for the first time by the practice of my process.

These compounds may be generally characterized as thermally stable, non-olefinic fluorocarbons. By analogy to well-known terminology applicable to hydrocarbons, they may be further characterized as: (A), compounds of the aliphatic series, (B), compounds of the alicyclic series, (C), compounds of the aromatic or benzenoid series. With respect to the aliphatic series, mentioned above, the only compounds heretofore definitely identified are $CF_4$ and $C_2F_6$. While the existence of $C_3F_8$ and $C_4F_{10}$ have been postulated, yet they have never heretofore been isolated or characterized. No compounds of either the alicyclic or aromatic series have been heretofore obtained.

The physical properties of the new fluorocarbons such as their melting point, boiling point, molecular weight, liquid density, heat of vaporization, and vapor pressure are given in the following table.

TABLE I
*Physical properties of fluorocarbons*

| Compound | M. P., Deg. C. | B. P., Deg. C. | Mol. Wt. | Liq. Dens. at ca. 0° C., g./cc. | Heat of Vap. per Mole Cal. | Vap. Press. ($\log_{10}$ P mm.) |
|---|---|---|---|---|---|---|
| $C_3F_8$ | −183 | −38 | 188 | 1.45 | 4,920 | $-\frac{1070}{T}+7.43$ |
| $C_4F_{10}$ #1 | glass | −4.7 | 230 | 1.53 | 5,600 | $-\frac{1217}{T}+7.43$ |
| $C_4F_{10}$ #2 | ...do... | 3.0 | 241 | | 5,800 | $-\frac{1260}{T}+7.44$ |
| $C_5F_{12}$ | ca. −12 | 23 | 254-9 | 1.72 | 6,200 | $-\frac{1350}{T}+7.43$ |
| $C_6F_{14}$ | glass | 51 | 300-3 | 1.65 | 6,900 | $-\frac{1500}{T}+7.51$ |
| $C_7F_{16}$ | ...do... | 80 | 350-5 | 1.83 | 7,400 | $-\frac{1610}{T}+7.43$ |

(T in degrees absolute.)

The above fluorocarbons and also the mixtures hereafter described are all colorless when liquid or gaseous, and white or colorless when solid. They are odorless, non-toxic, non-corrosive and of little chemical activity. They do not react with strong acid or with strong alkali at ordinary temperatures. They do not hydrolize with water. They do not burn or react with oxygen. They do not react with any of the metals at ordinary temperatures and react only with the more chemically active metals, such as sodium, at elevated temperatures (about red heat). The term "chemically inert" as used in the appended claims refers to and is limited by the above noted characteristics. They do not react with "Pyrex" laboratory type glass up to the fusion temperature of that material, viz. 750° C. Furthermore, at such temperatures there is no decomposition of these fluorocarbons. The term "thermally stable" as used in the appended claims refers to the above characteristics at temperatures up to 750° C. When in a liquid state the above fluorocarbons show a pronounced solvent action on greases and wax. They are useful as solvents, refrigerants, starting compounds for synthesis and a number of other uses.

It has been found that these new fluorocarbons may be obtained by fractional distillation of the crude reaction product obtained by heating finely divided carbon in an atmosphere of fluorine while employing a catalyst of the character above mentioned. Previous attempts to prepare fluorocarbons by reacting carbon with fluorine have not only failed by reason of the resulting explosions but have also been substantially limited to the production of carbon tetrafluoride ($CF_4$) and hexafluoroethane ($C_2F_6$), which together accounted for approximately 95% of the product of these reactions, the remainder being unidentified material boiling above −78° C. This small residual mixture has been reported as containing silicon tetrafluoride and was subject to sepeculation that it might contain higher boiling compounds of carbon and fluorine, which, however, were never isolated or identified, in fact there is no evidence that this residual mixture was ever obtained in sufficient amount to permit of definite identification. It will be evident that production of a reaction product of fluorine and carbon, which is composed of 10% or more of fluorocarbons having three or more carbon atoms per molecule, is a great improvement over anything in any way suggested in the prior art; and that such a reaction product containing fifteen, twenty or twenty-five percent of such higher fluorocarbons is still more novel and advantageous. By the use of metallic catalysts I have been able not only to conduct a smooth reaction free from explosions but have also been able to obtain substantial quantities of a reaction product of which from ⅓ to ⅔ were the compounds of fluorine and carbon having three or more carbone atoms to the molecule, thus permitting for the first time the isolation and determination of properties of these higher fluorocarbons.

One process which may be employed for preparing these new fluorocarbons is the following:

One of the elements, or a compound thereof, effective in catalyzing the reaction is intimately mixed with finely divided carbon in a quantity equivalent to from 1 to 5%, depending upon the type of catalyst employed. The carbon and catalyst mixture is then placed in a reaction chamber which is heated to the temperature necessary to effect the reaction while gaseous fluorine is passed through the chamber. I have obtained satisfactory results at temperatures of from approximately 200° to 600° C. but temperatures of the order of 300° C. are preferred, not only as favoring the production of the desired fluorocarbons of higher molecular weight, but also as affording an adequate margin of safety against explosion. It should be understood that both the percentage of catalyst employed and the temperature at which the reaction is conducted vary depending upon the kind of carbon used. Thus graphite requires a temperature in the higher portion of the above range, whereas an adsorption grade of charcoal such as that known by the trade name of "Norit" has been found to give excellent results at the lower temperatures. From the outlet of the reaction chamber the gaseous and vaporous products are passed through a tank of an alkaline solution to remove such portions thereof as may constitute unreacted fluorine, hydrogen fluoride, or other impurities, after which they are led into a gasometer, where they are collected over water. To effect the separation of the various fluorocarbons thus produced, the gaseous products are condensed from the storage chamber by passing them through a freezing chamber in which the cooling medium is preferably liquid air. After first removing $CF_4$ at its boiling point of approximately $-128°$ C. and $C_2F_6$ at approximately $-78°$ C., octafluoropropane ($C_3F_8$) is obtained at approximately $-38°$ C.; the two isomeric fractions of decafluorobutane $C_4F_{10}$ #1 and $C_4F_{10}$ #2 are obtained at temperatures of approximately $-4.7°$ C. and $+3°$ C., respectively; the five-carbon atom fluorocarbon ($C_5F_{10}$) is obtained at approximately 23° C.; while the six-carbon atom fluorocarbon ($C_6F_{12}$) and the seven-carbon atom fluorocarbon ($C_7F_{14}$) are obtained at temperatures of approximately 51° and 80° C. respectively.

To purify the new compounds thus obtained each fraction is refractionated in the same manner and then passed through chambers containing potassium hydroxide and phosphorous pentoxide. Any air remaining in the various fluorocarbons may be removed by alternate vaporization, condensation and pumping.

In addition to the above definite boiling compounds, fractions were removed over the temperature range of from 23° C. to 51° C.; from 51° C. to 80° C.; and from 80° C. to 95° C., after which there remained a residue which was subsequently determined to consist of fluorocarbons boiling in excess of 95° C. In each of the above identified fractions the material was found to have a progressively increasing boiling point within the stated limits showing that the same consisted of mixtures of fluorocarbons not separable under fractionating conditions used to separate the definite boiling point compounds.

The process for producing these new compounds is not confined to the materials and steps herein specifically recited. As above indicated, different kinds of powdered or granulated carbon may be employed. The catalyst employed may be obtained from the action of fluorine on mercury, antimony, aluminum or iron, or compounds containing any one thereof, or from a combination of two or more of the above metals or compounds thereof. The reaction has been satisfactorily effected without the use of a separate catalyst as such by using a reaction chamber made of mercury-amalgamated copper tubing or containing a mercury-amalgamated copper screening, thereby providing mercury for catalytic action. The temperature at which the reaction is carried out is not critical providing it be sufficiently high to effect the combination of the carbon and fluorine. Other possible variations in the process above described will be obvious to those skilled in the art.

Exemplary of one process which has been employed to produce the new fluorocarbons is the following procedure:

Finely divided "Norit" was placed in a copper reaction tube provided at one end with an inlet and at the other end with an outlet. The copper tube was approximately 25 inches long and 2 inches in diameter. The "Norit" contained crystals of mercuric chloride in the ratio of 1 gram to 50 of the carbon. A roll of amalgamated copper screening was placed in each end of the reaction chamber. Fluorine gas was passed through the tube and the tube was heated to a temperature between 400° and 600° C. From the outlet of the reaction chamber, the products in gaseous and vapor form were led through a sodium hydroxide solution and into a gasometer where they were collected over water. Under the above conditions, it was found possible to collect about 1½ liters of reaction products per hour.

The reaction products were separated by condensation in a liquid air trap and subsequent fractional distillation. Fractions were taken at points where the temperature and the molecular weight determinations remained constant, the latter being made simultaneously with the fractionation process by means of a density balance. Between certain of the compounds having constant boiling points, mixtures boiling at progressively increasing temperatures were obtained. Each fraction was refractionated in the same manner and then purified by passing through potassium hydroxide and phosphorous pentoxide. Air was removed by alternate vaporization, condensation and pumping.

The fluorocarbons and mixtures thus prepared and the quantities obtained are given in the following table:

TABLE II

| Compound | B. P., Deg. C. | Volume (liquid) | Per cent by Volume |
|---|---|---|---|
| | | Parts | |
| $CF_4$ | −128 | 246 | 54.5 |
| $C_2F_6$ | −78.2 | 57 | 12.6 |
| $C_3F_8$ | −38 | 37 | 8.2 |
| $C_4F_{10}$ #1 | −4.7 | 24 | 5.3 |
| $C_4F_{10}$ #2 | 3.0 | 6 | 1.3 |
| $C_5F_{10}$ | 23 | 25 | 5.5 |
| Mixture "A" | 23 to 51 | 14 | 3.1 |
| $C_6F_{12}$ | 51 | 20 | 4.4 |
| Mixture "B" | 51 to 80 | 7 | 1.5 |
| $C_7F_{14}$ | 80 | 6 | 1.3 |
| Mixture "C" | 80 to 95 | 4 | .9 |
| Residue | 95 to 160 | 7 | 1.6 |
| Total | | 435 | 100.0 |

A further exemplary process is the following:

Finely divided "Nuchar" was mixed with approximately 2 percent by weight of mercuric oxide and placed in a boat made of sheet iron. This boat was then placed in a 2 inch iron pipe approximately 2½ feet long. The iron pipe was placed in an electric furnace and maintained at a temperature between 250 to 300° C. Fluorine gas from the generator and without purification was passed through this iron tube at a rate of approximately 3 liters per hour. The products from the reaction tube were condensed in a chamber kept at the temperature of liquid air and were subsequently purified and fractionated. The purification consisted of a treatment with the concentrated sodium hydroxide solution and a treatment with phosphorous pentoxide. The products formed had properties and characteristics of approximately that given in the previous example. More than one-half of the material remained in the liquid state when at temperature $-78°$ C., from which it is apparent that a higher ratio of fluorocarbons having three or more carbon atoms to the molecule was obtained than in the preceding example.

The above procedure was repeated except that instead of mercuric oxide, powdered elemental antimony was used in an amount of 4% of the weight of the carbon. Approximately ⅔ of the total of the reaction product was found to remain in the liquid state at $-78°$ C. and to consist of fluorocarbons having more than three carbon atoms to the molecule.

Other catalysts which promote a smooth, non-non-explosive reaction between carbon and fluorine are iron and aluminum. I have also used successfully, mixtures of mercury with the other above mentioned catalysts. In all cases in which these catalysts or mixtures of catalysts are used, the temperatures at which a smooth, non-explosive reaction is obtained are below 600° C., but I have found that mercury and its compounds permitted the greatest reduction in temperatures and thereby induced the greatest shift toward higher molecular weight products. Additionally, I have found that no significant portion of mercury fluoride or aluminum fluoride passes over with the reaction product, whereas when antimony is used the volatility of the fluoride is such that it passes off rapidly with the reaction product and must be replenished.

The following is further detailed information with respect to the chemical and physical characteristics and also the utility of the various fluorocarbons and mixtures thereof which I have obtained by my new process above disclosed.

OCTAFLUOROPROPANE

One of the new compounds is the open chain or aliphatic fluorocarbon containing three carbon atoms per molecule and corresponding to the formula $C_3F_8$. This new compound possesses properties very much in agreement with those postulated from theoretical considerations. Its molecular weight as determined by means of the density balance was found to be 188 in direct conformance with the theoretical molecular weight for $C_3F_8$. Other physical characteristics are given in Table I. Separate analyses of this material for the respective elements give results of fluorine 80.5% and carbon 19.9%, which establishes a fluorine to carbon atomic ratio of 2.56. The corresponding theoretical data would be— fluorine 80.85%, carbon 19.15%, atomic ratio 2.67.

This inert material with its very long liquid range at low temperatures is an ideal refrigerant. It is also useful as a low temperature heat transfer liquid and a low temperature solvent.

DECAFLUOROBUTANE

Other members of this new series of compounds are the two isomeric forms of the open chain or aliphatic fluorocarbon containing four carbon atoms to the molecule and corresponding to the formula $C_4F_{10}$. Two distinct fractions were obtained having boiling points of $-4.7°$ C. and $3.0°$ C. respectively. This together with other determined characteristics indicates that these decafluorobutanes or chain compounds are analogous to normal butane and isobutane. The molecular weights of the two fractions were determined as 230 and 241 respectively, deviating somewhat from the theoretical 238 due to the difficulty in separating two substances with such a small difference in boiling temperatures. The melting points were difficult to determine, since both fractions formed a glass when condensed from the vapor. Other physical properties of these two compounds also differ as shown in Table I.

Separate analyses of the lower boiling isomer showed fluorine 80.5%, carbon 18.8%, with fluorine to carbon atomic ratio of 2.7 (theoretical— fluorine 79.85%, carbon 20.15%, atomic ratio of 2.5). Analysis of the higher boiling isomer showed fluorine 78.8% and a fluorine to carbon atomic ratio of 2.34. The average fluorine to carbon atomic ratios of these two isomers is 2.52 as compared with the theoretical 2.50.

These decafluorobutanes are useful for solvents, refrigerants and as heat transfer media.

$C_5F_{10}$

Another compound which I have obtained is the ring or alicyclic fluorocarbon containing five carbon atoms per molecule and corresponding to the formula $C_5F_{10}$. Separate analyses of this material showed fluorine 76.4%, carbon 24.2%, giving an atomic ratio of 1.995 (theoretical—fluorine 76%, carbon 24%, atomic ratio 2.00). The Raman spectrum and the electron diffraction of this compound give simple patterns indicating that this five carbon atom fluorocarbon can be either the neopentyl ($C_5F_{12}$) or the cyclic ($C_5F_{10}$) structure. Its molecular weight and analysis however, show it to be the cyclic compound corresponding to the formula—

since its molecular weight has been determined to be between 254 and 259, conforming with the theoretical molecular weight of 250 for $C_5F_{10}$. The presence of some chain compounds of the formula $C_5F_{12}$ boiling at the same temperature range probably accounts for the discrepancy in molecular weight of this faction over the theoretical molecular weight. Other physical properties of this compound are given above in Table I.

This compound is particularly useful for a low boiling point solvent, a fire extinguisher or a heat transfer medium.

$C_6F_{12}$

Another of these compounds is the ring or alicyclic fluorocarbon, boiling at 51° C. and having six carbon atoms per molecule. It was found to have a molecular weight between 300 and 303, thus corresponding with the theoretical molecular weight of 300 for $C_6F_{12}$. This compound tends to form crystals when condensed from the vapor, in small amounts, but larger amounts form a glass. A melting point for this compound was not obtained. Separate analysis showed fluorine 76.1%, carbon 24.6%, giving a fluorine to carbon atomic ratio of 1.955 (theoretical—fluorine 76%, carbon 24%, atomic ratio 2.00). Other physical properties of this material will be found in Table I, is given above.

This material is an excellent solvent, a fire extinguisher, an extraction medium, an inert medium for chemical reactions, and a heat transfer medium.

$C_7F_{14}$

A compound corresponding to the formula $C_7F_{14}$ is another of the newly discovered ring or alicyclic fluorocarbons. This compound boils at 80° C. and has a molecular weight between 350 and 355. The theoretical molecular weight for a $C_7F_{14}$ compound is 350. Like the six carbon atom fluorocarbon, this compound tends to form crystals when condensed in small amounts from its vapor but larger amounts form a glass. Time-temperature curves for both the six-carbon-atom fluorocarbon and the seven-carbon-atom fluorocarbon show no melting points. Analysis showed fluorine 76%, carbon 23.1%, giving a fluorine to carbon atomic ratio of 2.08, (theoretical—fluorine 76%, carbon 24%, atomic ratio 2.00). Other physical properties of this compound are given in Table I above.

This material is particularly useful as a solvent, as an inert medium for chemical reactions, as a hydraulic liquid, as a heat transfer medium and as a dielectric.

In addition to the compounds having definite boiling points as enumerated above and also as tabulated in Table I, which have been isolated and identified as the definite fluorocarbons above set forth, the fractional distillation of the mixture of fluorocarbon compounds resulting from the reaction according to my process has been found to produce fractions having a progressively increasing boiling point within the limits set forth in Table II.

MIXTURE "A"

*Fluorocarbon mixture boiling between 23° C. and 51° C.*

This fraction, which showed a continuously increasing boiling point, was removed subsequently to the constant boiling compound $C_5F_{10}$ and prior to the constant boiling compound $C_6F_{12}$. The average molecular weight of this fraction was found to be 302. It was found by separate analyses to contain 79.2% fluorine and 22% carbon which gives a fluorine to carbon atomic ratio of 2.3. As the fluorine to carbon atomic ratio of $C_5F_{10}$, removed immediately prior and of $C_6F_{12}$, removed immediately subsequent to the fraction is, in each case, 2.00, this definitely proves that this fraction boiling between 23° C. to 51° C. must contain principally chain or aliphatic compounds. The chain or aliphatic compounds which would be expected to boil in the range would be the isomers of the five and six carbon chain type fluorocarbons. These have fluorine to carbon atomic ratios of 2.4 and 2.33 and molecular weights of 288 and 338, respectively. The fact that the experimentally determined fluorine to carbon atomic ratio for the mixture boiling at 23° C. to 51° C. was 2.3, whereas the theoretical ratios for $C_5F_{12}$ and $C_6F_{14}$ are, respectively, 2.4 and 2.33, indicates contamination with the five and six carbon alicyclic compounds with a ratio of 2.00 or with a very small proportion of a benzenoid fluorocarbon.

This material is useful as a solvent, an extraction liquid, a fire extinguishing liquid, an inert medium for chemical reactions, and as a heat transfer medium.

MIXTURE "C"

*Fluorocarbon mixture boiling between 80° C. and 95° C.*

This fraction also distilled at continuously increasing temperature and was removed immediately after the $C_7F_{14}$ fraction boiling at 80° C. and including material boiling up to 95° C. The average molecular weight in the fraction was found to be 358. The values obtained upon analysis were: fluorine from 71.3% to 71.8%; carbon 28.4%, giving a fluorine to carbon ratio of 1.59. When the vapor of this fraction, together with fluorine, was passed over $HgF_2$ at 100° C. no significant change in fluorine analysis was observed. This eliminates the possibility of olefinic fluorocarbons or hydrocarbons being present in the original fraction because, if present, they would have been fluorinated. Therefore, the very low fluorine to carbon atomic ratio (1.59) must be taken as proof that fluorocarbons of the aromatic or benzenoid series were present in substantial proportion. The fluorine to carbon ratios for the six-, seven- and eight-carbon fluorocarbons in this series would be, respectively, 1.00, 1.14 and 1.25 whereas the ratio for the chain or aliphatic compounds must always be greater than 2 and for the alicyclic compounds boiling in this range, 2.00. (The number of carbon atoms per molecule in compounds boiling within this range could not be large enough to permit polycyclic, saturated compounds, with a fluorine to carbon atomic ratio less than 2.00, to be present.) It is evident, therefore, that the fraction of reaction product boiling in the range 80°-95° C. must contain a substantial proportion of aromatic or benzenoid fluorocarbons.

This fraction is most useful as a solvent, as a heat transfer medium, as an inert medium for chemical reactions, as a hydraulic liquid, as a high density extraction liquid and as a dielectric.

MIXTURE "B"

*Fluorocarbon mixture boiling between 51° C. and 80° C.*

This fraction also distilled with continuously increasing temperature and was removed after the $C_6F_{12}$ fraction boiling at 51° C. and immediately prior to the $C_7F_{14}$ fraction, boiling at 80° C. It was an inert, thermally stable fluorocarbon mixture. The composition of this fraction is apparent from the compositions of mixture A, known to contain aliphatic or chain type compounds and mixture C, known to contain aromatic or benzenoid type compounds. Because of incomplete separation of the alicyclic compounds $C_6F_{12}$ and $C_7F_{14}$ some of these are also present. This mixture B therefore contains representative members of the three series of non-olefinic thermally stable fluorocarbons, namely the aliphatic, the aromatic, and the alicyclic.

This mixture B, boiling between 51° C. and 80° C. is useful as a solvent, an inert liquid medium, a fire extinguisher liquid, a heat transfer medium, and a hydraulic liquid.

*Fluorocarbon mixture boiling above 95° C.*

This fraction was found to contain 77% flourine and (by difference) 23% carbon, corresponding to a fluorine to carbon atomic ratio of 2.1 On account of the large range in boiling point, it was difficult to obtain a reliable value for average molecular weight; a value of 424 was obtained experimentally, but is probably to low. However this molecular weight definitely indicates fluorocarbons having eight or more carbon atoms to the molecule.

For reasons unknown, there appear to be insufficient amounts of aromatic or benzenoid fluorocarbons present in this fraction to lower the average fluorine to carbon atomic ratio sufficiently to provide proof of their presence, although in the next lower boiling mixture (80° to 95° C.) conclusive evidence was obtained for a very substantial proportion of such fluorocarbons. The fact that the experimentally determined atomic ratio is above 2.00, indicates the presence of chain or aliphatic compounds.

This material, in addition to being useful as in inert solvent or liquid medium is useful as a hydraulic liquid, a heat transfer medium, a turbine impellent, a transformer liquid, a dielectric and a lubricant. It is also useful as an additive to other materials to confer upon the mixtures some of the desirable properties of the fluorocarbons.

In the appended claims the term "fluorocarbons" defines compounds consisting only of carbon and fluorine. Also the term "mercury catalyst" comprises mercury, mercuric and mercurous salts, and mercury containing metals such as amalgamated metals and the like.

It is to be expressly understood that the foregoing description and examples are illustrative only and are not to be considered as limiting the invention beyond the scope of the claims.

Attention is called to my copending subsequent applications filed as divisions or continuations-in-part of the present application and directed to certain novel fluorocarbon compounds produced by the method herein described and claimed, namely, Ser. No. 684,785 (filed July 19, 1946), Serial No. 684,786 (filed July 19, 1946) now abandoned, Ser. No. 788,651 (filed Nov. 28, 1947), Ser. No. 789,553 (filed Dec. 3, 1947), and Ser. No. 790,437 (filed Dec. 8, 1947).

I claim:

1. A process for the production of fluorocarbons which comprises heating carbon to a temperature of from 200° C. to 600° C. in an atmosphere of fluorine and in the presence of at least one material from the group consisting of the fluorides of mercury, antimony, aluminum and iron, serving as a catalyst to cause smooth non-explosive reaction between the carbon and the fluorine within said temperature range.

2. A process for the production of a fluorocarbon which comprises heating carbon to an elevated temperature in an atmosphere of fluorine and in the presence of a mercury fluoride catalyst.

3. A process for the production of fluorocarbons which comprises contacting gaseous fluorine with carbon at a temperature above 400° C. in the presence of a mercury fluoride catalyst.

4. A process for the production and separation of a fluorocarbon comprising contacting fluorine with carbon at elevated temperatures in the presence of a mercury fluoride catalyst, and fractionally distilling the product obtained thereby.

JOSEPH H. SIMONS.

REFERENCES CITED

The following references are of record in the file of this patent:

Ruff and Keim, "Zeit. Anorg. Allgem. Chem.," vol. 192, pages 250–1 (1930).

Ruff and Bretschneider, Ibid., vol. 217, pages 2, 7, 10, 19–21 (1934).

Lebeau et al., "Compt. Rend.," vol. 191, pages 939–40 (1930).

Simons et al., "Jour. Am. Chem. Soc." vol. 59, page 1407 (1937).